United States Patent [19]

Shelton

[11] Patent Number: 4,568,058
[45] Date of Patent: Feb. 4, 1986

[54] DUAL STAGE HYDRAULIC ACTUATOR FOR EXPANDING GATE VALVE

[75] Inventor: William S. Shelton, Houston, Tex.

[73] Assignee: Joy Manufacturing Company, Pittsburgh, Pa.

[21] Appl. No.: 750,460

[22] Filed: Jul. 1, 1985

[51] Int. Cl.$^4$ .................. F16K 31/143; F15B 11/02; F01B 7/20

[52] U.S. Cl. .................. 251/62; 251/196; 251/202; 92/13.8; 92/51; 92/62

[58] Field of Search .................. 251/62, 63, 162, 163, 251/203, 204, 193, 195, 197, 75, 63.5, 63.6, 63.4, 196, 198, 199, 200, 201, 202, 327; 92/62, 13.2, 51, 13.8; 91/519

[56] References Cited

U.S. PATENT DOCUMENTS

| | | | |
|---|---|---|---|
| 3,244,399 | 4/1966 | Jones et al. | 251/62 X |
| 3,469,503 | 9/1969 | Adler et al. | 92/62 |
| 4,103,863 | 8/1978 | Houlgrave et al. | 251/196 X |
| 4,309,022 | 1/1982 | Reinicke et al. | 251/63.6 X |
| 4,535,967 | 8/1985 | Babbitt et al. | 251/193 |

FOREIGN PATENT DOCUMENTS 2072265  3/1981  United Kingdom .................. 92/51

Primary Examiner—Martin P. Schwadron
Assistant Examiner—John S. Starsiak, Jr.
Attorney, Agent, or Firm—Marvin J. Marnock

[57] ABSTRACT

A dual stage hydraulic actuator (9) for actuation of an expanding gate valve (10). The actuator is mountable to the valve housing and comprises a housing 40 which defines a piston chamber 41 and a primary piston (61) slidably received therein. An actuator stem (23) connects the piston (61) to the valve gate assembly (20). A secondary piston (77), of smaller piston area than the primary piston (61), is slidably received in a piston receiving bore (75) which is formed in the fluid receiving face of the primary piston. A piston rod (80) connects coaxially with the piston (77) and extends through the end (52) of the actuator housing. The actuator is responsive to hydraulic fluid pressure which when applied through an inlet (71) of the actuator housing to one side of the pistons (61, 77) drives the actuator stem and gate assembly to an operational open or closed position of the valve. A spring means (66, 67) in the piston chamber (41) continuously urges the primary piston (61) in the direction which opposes the hydraulic pressure. A stop element 85 on the piston rod 80 is adapted to engage the end (52) of the actuator housing to limit the length of the secondary piston stroke to a lesser length than that of the primary piston stroke whereby the effective piston area of the actuator (9) for driving the actuator stem (23) and the gate assembly (20) is reduced by an amount equal to the area of the second piston and there is a corresponding reduction in stress imposed on the actuator stem in the latter stage of actuator thrust.

5 Claims, 2 Drawing Figures

DUAL STAGE HYDRAULIC ACTUATOR FOR EXPANDING GATE VALVE

BACKGROUND OF THE INVENTION

This invention relates to a hydraulic actuator and more particularly to a dual stage hydraulic actuator for operation of an expanding gate valve.

Heretofore, the use of fluid-powered actuators to effect the operation of gate valves has been generally restricted to use with gate valves of the slab-gate type. The very large sealing forces of valves of the expanding gate type require a very powerful actuator thrust to break the seal and such a powerful thrust runs a high risk of causing serious damage to the valve components or the actuator itself. Also, very large piston springs are required to return the actuator piston upon release of fluid pressure from the actuator and such springs so significantly increase the size, weight and expense of the actuator that their use is practically prohibitive. Nevertheless, the inherent advantages provided by expanding gate valves in the handling of very high fluid pressures has created a need for the use of fluid-powered actuators with expanding gate valves.

The use of a pneumatic-powered actuator for opening and closing an expanding gate valve is shown in U.S. patent application Ser. No. 568,460, filed Jan. 5, 1984, now U.S. Pat. No. 4,535,967. However, hydraulic actuators as opposed to pneumatic actuators are preferred in many applications, such as subsea environments, where power, small size and reliability are important criteria. The use of hydraulic actuators for the operation of expanding gate valves presents many problems. The very large thrust force which is required to operate these valves when in the expanded open or closed conditions, will break the oftentimes crush the actuator stem or deform it such that the valve or actuator are so damaged as to become inoperative. This probably cannot be readily solved by providing a stronger, larger actuator stem because the associated required increase in the size of the of actuator becomes prohibitive.

Most hydraulic actuators used with slab-type gate valves utilize a sleeve or piston downstop which is usually installed between the piston and the bonnet adapter plate to prevent the application of the maximum actuator load to the valve stem but because of the tolerances involved in the gate wedging geometry, it is not practical to install a piston downstop for actuators for expanding gate valves.

One possible solution is to simply derate the actuator to allow it to function at approximately 1½ times its maximum operating pressure. Because of the wide variation in supply pressures for hydraulic systems in well production systems, generally 1500 psi and 3000 psi systems, it is not popular or practical to simply derate the actuator to allow it to function at only 1½ times its minimum operating pressure.

Accordingly, it is an object of the invention to provide a hydraulic actuator which will deliver the required output load to operate an expanding gate valve yet still be able to accept very high actuating fluid pressures without overstressing the actuator stem or other valve components.

A further object is to provide a dual stage fluid-powered actuator of the piston type which will provide a very high initial thrust in its first stage of operation and a reduced thrust in the latter stage of the actuator stroke.

SUMMARY OF THE INVENTION

The invention is directed to a dual stage hydraulic actuator for actuation of the control element of a mechanical device such as the gate assembly of an expanding gate valve. The actuator, which is mounted atop the valve housing, comprises an actuator housing defining a piston chamber, a first actuator piston slidably received in the housing, and an actuator stem which connects the piston to the valve gate assembly. The actuator is responsive to a source of hydraulic fluid pressure which when applied through an inlet of the actuator housing to one side of the first piston drives the actuator stem and gate assembly to an operational open or closed position. A spring means in the piston chamber continuously urges the first piston in the direction which opposes the hydraulic pressure. A secondary piston, of smaller piston area than the first, is fitted into a piston receiving bore which is formed in the fluid receiving face of the first piston. A piston rod is affixed at one end to the second piston in coaxial alignment with the actuator stem and extends through an opening in the actuator housing in fluid sealing relationship therewith. A stop member affixed to the piston rod is adapted to cooperably engage the actuator housing to limit the length of the second piston stroke to a lesser length than that of the first piston stroke when hydraulic fluid is admitted to the piston chamber whereby the effective piston area of the actuator for driving the actuator stem and valve gate assembly is reduced by an amount equal to the area of the pressure receiving face of the second piston and there is a corresponding reduction in the stress imposed on the actuator stem in the latter stage of actuator thrust.

DETAILED DESCRIPTION OF A PREFERRED EMBODIMENT

Figure 1:
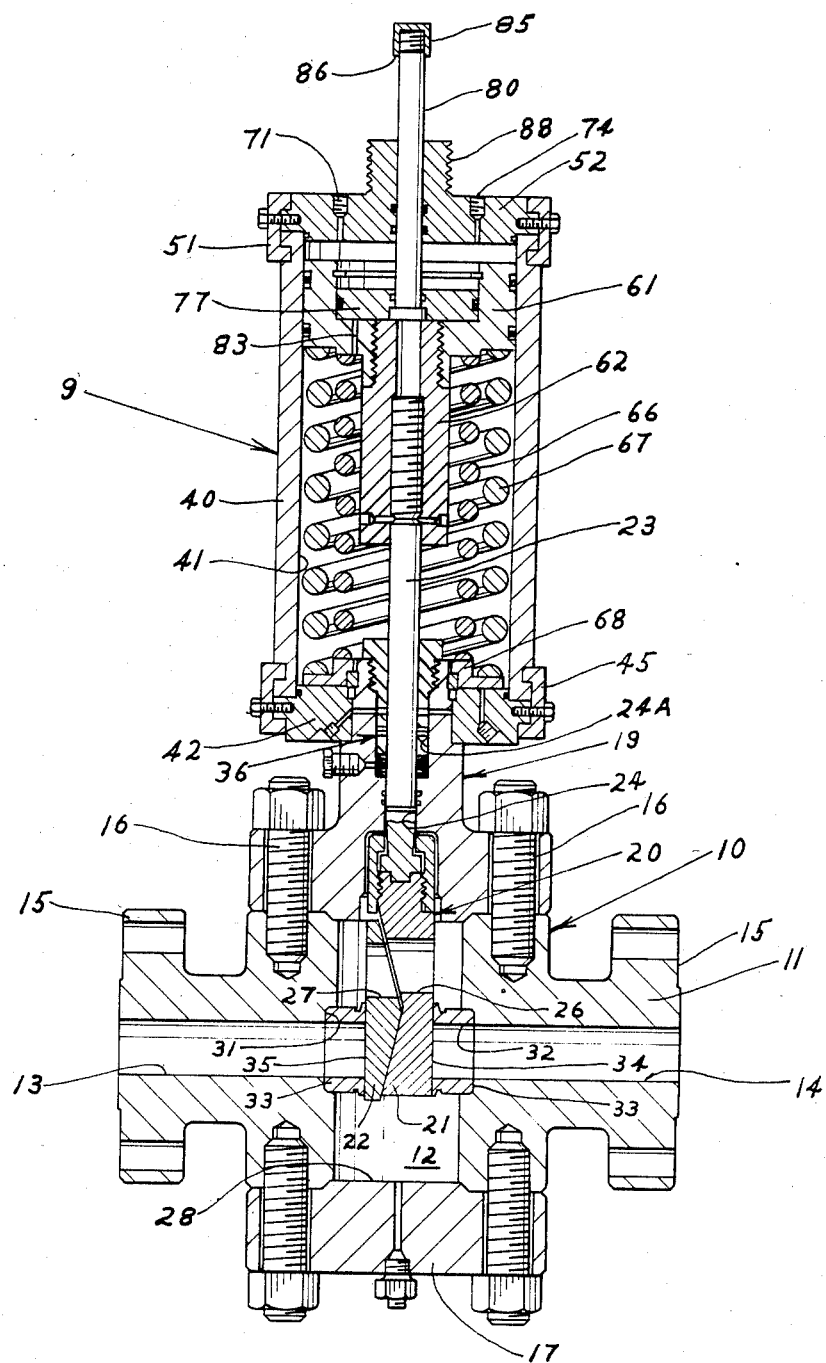
FIG. 1 is a vertical sectional view of the dual stage hydraulic actuator of this invention shown installed on the valve housing of a gate valve of the expanding gate type.

As shown in FIG. 1, the actuator 9 of this invention is shown mounted to a gate valve 10 for controlling the operation of the valve. The valve 10 comprises a valve body 11 having a valve chamber 12 therein and inlet and outlet flow passages 13, 14 defining a flow way which extends through the valve and intersects the valve chamber 12. End flanges 15, each in surrounding relation to the flow way, are provided on the valve body to accommodate its installation in a flowline. The valve is also provided with a bonnet 19 which is bolted atop the valve body 11 by means of bolts 16 and closes off the valve chamber 12.

The valve 10 further includes a gate assembly 20 of conventional design which is mounted within the valve chamber for sliding movement transversely of the flow way to open or close the valve. The gate assembly 20 includes a gate member 21 and a segment 22. The gate member 21 is connected at its upper end to the lower end of a valve stem or actuator stem 23 which extends through a central axial bore 24 in the bonnet 19. The stem 23 is connected to the gate member 21 so that upon actuation of the stem 23 in the axial direction, as will hereinafter be described, the gate assembly 20 is movable across the flow way between a first position wherein the valve is open and a second position wherein the valve is closed. In the open position of the valve, not shown, ports 26, 27 in the gate and segment members, respectively, are aligned in registry with the flow passages 13, 14. Also, as is conventional, the gate member 21 is provided with a V-shaped recess which accommodates the wedge shaped segment 22, the wedge faces of which conform to the surfaces of the V-shaped recess and are in sliding contact therewith. As is well known to those skilled in the art, the linear movement of the gate assembly to open or close the valve, cause an expansion of the gate assembly in the open and closed positions due to relative sliding movement between the gate member 21 and the segment 22, the relative sliding movement being induced by suitable stop means, such as the surface 28 of the valve end plate 17 which closes off the valve chamber 12 and which limits the vertical movement of the segment 22 relative to the gate member 21 as the gate assembly nears its valve open positions. A similar stop means adjacent the top end of the valve chamber 12 restricts the movement of the segment relative to the gate member as the gate assembly nears its valve closed position.

At the inner ends of the flow passages 13, 14, the valve body 11 is provided with annular recesses 31, 32, respectively, surrounding the flow passages 13, 14 in concentric relation therewith and opening into the valve chamber 12. The annular recesses 31, 32 form seat pockets in each of which a valve seat ring 33 is inserted.

For sealing, the gate member 21 is provided with a flat outwardly facing sealing surface 34 which is oriented substantially parallel at all times to a similar sealing surface 35 on the segment 22 which faces in the opposite direction towards the inlet passage 13. When the gate assembly is expanded in the open and closed conditions of the valve, the surfaces 34, 35 establish sealing relationships with the valve seats 33. When in transit between the open and closed positions, the gate assembly assumes a collapsed condition which is induced by a suitable means (not shown) affixed to the sides of the gate and segment members for continuously urging these members to a "nested" relationship wherein the respective apexes of their inner wedge surfaces are aligned. A suitable mechanism for collapsing the gate assembly to its "nested" condition is shown in U.S. Pat. No. 4,334,666.

The gate is connected to the stem 23 by any suitable connection but is preferably a low stress stem connection such as shown in U.S. Pat. No. 3,923,285. The stem 23 extends through the bonnet bore 24 and a packing gland assembly 36 which is mounted in an enlarged diameter portion 24a of the bonnet bore 24. Annular packing rings 38 of the packing assembly are disposed in the bore section 24a and provide fluid-tight sealing between the valve bonnet and the valve stem when compressed by the packing adapter 37 which is threaded into the enlargement 24a of the bonnet bore 24. The stem packing, of course, may be other than shown and maybe any packing suitable as a valve stem shaft packing.

The actuator 9 which is used to actuate the gate valve 10 is shown mounted atop the valve body 11. The actuator 9 comprises a hollow cylindrical housing member 40 of circular cross-section which defines an actuator piston chamber 41. The cylindrical housing 40 is closed at one end by a circular housing end member 42. The housing end member 42 is formed with a central axial bore 43 which receives the upper end of the valve bonnet 19 in close fluid sealing relation therewith as the actuator is mounted on the valve 10. The end member 42 seats on an annular bonnet shoulder 44 which is formed by a reduction in diameter of the upper end of the bonnet 19. The actuator cylinder 40 is clamped to the end member 42 by a split clamp 45 having inner flanges 46, 47 which seat, respectively, in circumferential grooves formed in the exterior of the cylinder 40 and the end member 42 and which is bolted to the end member 42 by bolts 48. A similar split ring clamp 51 is used to secure the upper end member 52 of the actuator to the cylinder 40 by bolts 53 and inner clamp flanges 54, 55 which are accommodated in circumferential grooves formed, respectively, in the exteriors of the end member 52 and adjacent the upper end of the cylinder 40.

Figure 2:
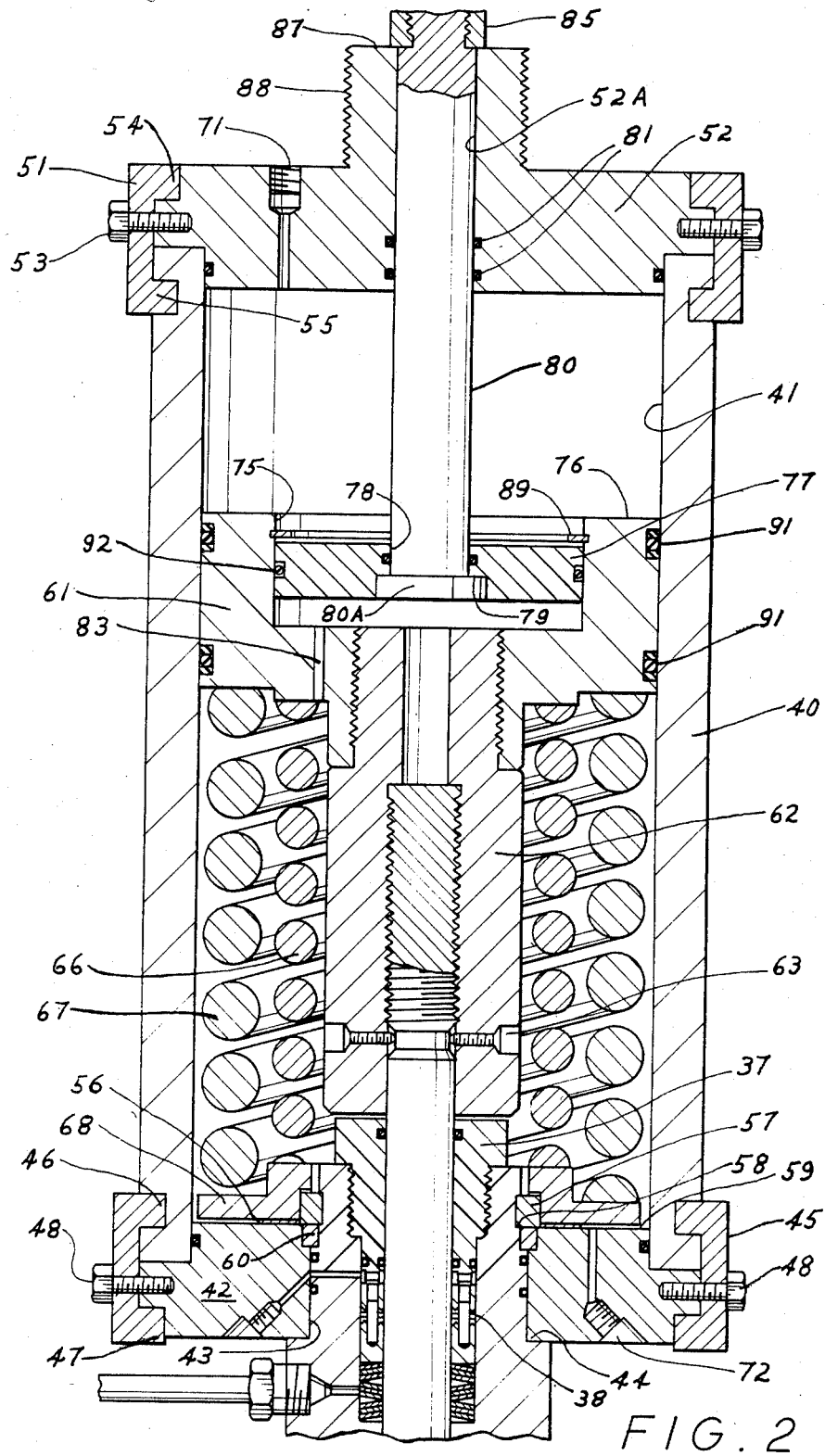
FIG. 2 is an enlarged fragmentary sectional view of the actuator of FIG. 1 showing the relative positioning of the two pistons of the actuator after hydraulic fluid under pressure has been admitted to the piston chamber of the actuator housing and the actuator has completed actuation of the gate valve.

As best shown in FIG. 2, it will be seen that the actuator 9 is secured to the top of the valve body 11 by a split ring 57 which is received in an external groove 58 formed around the exterior of the bonnet 19 near its upper end and clamps against the surface 59 of the actuator housing end member 42 which is an inner end wall of the actuator piston chamber 41. In addition, one or more keys 60 are fitted into aligned slots in the exterior of bonnet 19 and the wall formed in the central axial bore of the end member 42 to prevent any relative rotation of the actuator with respect to the valve body 11.

The actuator 9 includes a piston assembly having a primary piston 61 which is threaded onto the upper end of an adapter 62, which is in turn connected to the upper end of the actuator stem 23 as an extension of the stem 23 and further secured thereto by set screws 63. As shown, the piston 61 is in coaxial alignment with the actuator stem 23.

The piston 61 is biased towards the upper end of the piston chamber 41 by a pair of coiled springs 66, 67 which are arranged in sleeved relation to one another and around the actuator stem 23 and its adapter extension 62. The upper ends of springs 66, 67 abut the underside of piston 61 and the lower ends of the springs abut an annular spring retainer 68 which is seated over the clamp ring 57 atop a washer 56 on end member 42. For purposes of reducing the size of the actuator 9, a pair of coiled springs rather than a single spring is preferred to continuously urge the piston 61 in a direction away from the valve body 10.

A fluid pressure inlet 71 is provided in the end member 52 of the actuator 9 and is formed with internal threads for accommodating its connection to a pressure conduit leading to a source of hydraulic fluid pressure. As is readily apparent, hydraulic fluid under pressure delivered to the piston chamber through the inlet 71 will drive the piston 61 downwardly against the counterforce of the piston springs 66, 67 to where the gate assembly of the valve 10 is moved towards the bottom of the valve chamber 12 and is expanded into sealing engagement with the valve seats 33 to open the valve.

In the gate valve 10, the openings 26, 27 in the gate and segment members are located near the upper ends thereof and the valve is normally held in a "fail-safe"

closed condition when the piston 61 is adjacent the upper end of the piston chamber as shown in FIG. 1. It is to be understood, of course, that the openings 26, 27 could be located nearer the lower end of the gate assembly such that the valve is in open condition when the actuator pistons are adjacent the upper end of the actuator housing. Application of hydraulic fluid to the actuator would then actuate the valve to its closed condition.

To facilitate piston operation, a single opening 72 is provided through the lower end member 42 of the actuator 9 so that the interior of the actuator housing below the piston 61 is exposed to atmospheric pressure. The opening 72 is adapted to receive a fitting therein, for reasons hereinafter explained, and therefore the wall of the opening is threaded. Also, for safety reasons a pressure relief valve may be installed in an opening 74 provided in the top member 52 of the actuator housing as shown in FIG. 1 and in phantom lines in FIG. 2.

Since a very powerful thrust is required for actuation of a gate valve of the expanding gate type, the actuator 9 is provided with a unique feature for reducing the effective thrust of the actuator in the latter stage of an actuator stroke. A central bore 75 is provided in the top face 76 of the piston 61 and receives therein a secondary piston 77. The secondary piston 77 is provided with a central axial bore 78 which is enlarged at its lower end to provide a downward facing shoulder 79. A piston rod 80 is received through the bore 78 and is formed with an enlarged diameter end portion 80a of a diameter to be closely accommodated by the enlarged section of the bore 78 such that the secondary piston 72 seats atop the enlarged end portion 80a of the piston rod 80. The piston rod 80 extends through a central opening 52a provided in the top end member 52 of the actuator housing. To provide fluid-tight integrity, annular seals 81 are provided in the wall of the opening 52a and a similar seal 82 is provided in the wall of the central bore 78 in the secondary piston 77 for sealing against the piston rod 80. A bypass port 83 is also provided to extend from the bottom of the piston receiving bore 78 to the underside of the primary piston 61.

It will also be seen that the piston rod 80 is provided with a stop element in the form of a cap 85 which is threaded onto the threaded end of the piston rod outside of the actuator housing. The cap 85, in effect, increases the diameter of the piston rod and provides a downwardly facing shoulder 86 which is adapted to engage the raised surface 87 of a boss 88 formed about the central opening 52a in the end member 52 of the actuator housing.

It will thus be seen that upon admission of pressurized hydraulic fluid into the piston chamber through the fluid inlet, the fluid acting on the fluid receiving faces of both pistons will overcome the force of the springs 66, 67 and drive the pistons towards the end of the actuator housing mounted on the valve housing. Accordingly, the actuator stem 23 is driven downwardly as shown in the drawings, to move the gate assembly transversely with respect to the flow passages 13, 14 of the valve and place the gate assembly in the open position wherein the ports 26, 27 of the gate assembly elements are disposed in register with the flow passages 13, 14 and the gate assembly is in its expanded wedged sealing condition. During the actuator stroke, however, the stroke of the secondary piston is terminated before there is a termination of the stroke of the primary piston 61 due to the engagement of the stop 82 on the piston rod with the surface 85 of the top end of the actuator housing. This, in effect, subtracts the secondary piston area from the primary piston area as regards determining the effective piston area of the actuator. Only the annular area of the top surface 76 of the primary piston 61 which surrounds the secondary piston 77 is responsive to the application of the incoming hydraulic fluid and the actuator thrust is thereby reduced. This reduction in actuator thrust in the latter stage of the actuator stroke, allows the actuator to withstand the stresses associated with actuator stem thrust and minimizes the risk of crushing or deforming the actuator stem and damaging valve components while still permitting accommodation of high actuating fluid pressures. It also permits a reduction in spring size.

The location of the stop 85 on the piston rod 80 is determined such that the stroke of the secondary piston 77 is terminated soon after the gate bores 26, 27 comes into communication with the flow passages 13, 14. The termination of the stroke of the primary piston subsequently occurs when the gate assembly is "wedged off" or expanded in the full open position and the gate assembly is in tight sealing relation with the seat rings 33. As will be seen in FIG. 2, the stroke of the secondary piston 77 is such that the piston 77 does not exit the bore 75. Nevertheless, a snap ring retainer 89 is installed in an annular groove in the wall of the bore 75 above the piston 77 to retain the piston 77.

Another feature of the actuator 9 is its ready convertibility to a double acting piston type actuator. A fitting may be applied to the inlet 72 in the actuator housing such that the piston chamber in the portion thereof below the primary piston 61 may be pressurized when connected to a source of fluid pressure. In this manner, the piston springs 66, 67 are assisted in breaking loose the gate assembly from its expanded open condition and returning the actuator pistons to the position as shown in FIG. 1. The snap ring 89 prevents the piston 77 from being thrown out of the bore 75.

It is to be understood, of course, that the actuator housing is to be fluid-tight with the exception of the port 72 which is normally open unless the actuator is converted to the double acting piston type operation. Piston ring seals 91 are normally provided for the primary piston 61 and a piston ring seal 92 is provided about the secondary piston 77.

It is to also be understood that the foregoing description of a preferred embodiment of the invention has been presented for purposes of illustration and description and is not intended to limit the invention to the precise form disclosed. For example, the particular type of expanding gate valve may be other than shown. It is also possible to adapt the dual stage actuator of this invention to operate various mechanisms other than gate valves where it is advantageous to reduce the latter stage of actuator thrust. Accordingly, it is to be appreciated that changes may be made without departing from the spirit of the invention.

What is claimed is:

1. An actuator device for actuation of a gate valve of the expanding gate type which comprises a valve body with a valve chamber therein and a flow passage extending through said valve body and communicating with said valve chamber, an expandable gate assembly mounted within said valve chamber for movement in a collapsed condition between open and closed positions with respect to said flow passage, said gate assembly including a gate element and a segment which are expanded away from each other at said open and closed positions and are provided with ports which are aligned with one another and the flow passage in said open position, said gate element and segment being each provided with an outer sealing surface for sealing against valve seats provided in said valve body at opposite sides of the gate assembly when the gate assembly is expanded in the open and closed positions, said valve body having a bore extending from the exterior of the valve body into said valve chamber in generally transverse relation to said flow passage;

hydraulic powered actuator means for moving the gate assembly transversely with respect to said flow passage between said open and closed positions, said actuator means comprising an actuator housing mounted on said valve body and defining a piston chamber therewith;

a first piston slidably received in said piston chamber; an actuator stem connected at one end of said first piston and at its other end to the gate assembly, said first piston being movable with the actuator stem in the axial direction of the stem to move the gate assembly transversely with respect to said flow passage between said open and closed positions, said first piston being provided with a coaxial bore extending from one face of said first piston to a limited depth in said first piston and defining a piston receiving bore therein;

a smaller second piston slidably mounted in said piston receiving bore;

a piston rod affixed at one end to second piston and extending through an opening in said actuator housing in sealed relation therewith;

fluid inlet means provided through the wall of said housing and adapted for connection to a source of hydraulic pressure whereby pressurized hydraulic fluid may be selectively admitted to the piston chamber on one side of said pistons for stroking said pistons in one direction therein and moving the gate assembly from one of said open or closed positions to the other, said first piston stroke being terminated when the gate assembly is in its expanded sealing condition;

compression spring means in said chamber on the side of said pistons opposite said hydraulic fluid receiving sides for continuously urging said first piston in the opposite direction from said one direction;

a stop member affixed to said piston rod and with said cooperable actuator housing to limit the length of the second piston stroke to a lesser length than that of said first piston stroke when hydraulic actuating fluid is admitted to said piston chamber whereby the effective piston area of the actuator for driving the actuator stem and gate assembly is reduced by an amount equal to the area of the pressure receiving face of said second piston and the stress imposed on the actuator stem and valve components upon placement of the gate assembly in its expanded sealing condition is reduced.

2. An actuator device as set forth in claim 1 wherein said gate element and segment members of the gate assembly are provided with cooperable wedging surfaces which are adapted for relative sliding movement to cause expansion of the gate assembly in the open and closed positions.

3. An actuator device as set forth in claim 1 wherein said actuator housing is provided with a second inlet means through the wall thereof which is adapted for connection to a source of hydraulic pressure whereby pressurized fluid may be selectively admitted to said piston chamber on the side of said first piston opposite to that which is exposed to hydraulic fluid from said source for assisting the biasing force of said spring means.

4. An actuator device for effecting the actuation of a control element of a mechanical device such as the valve element of a gate valve, said actuator device comprising:

an actuator housing mounted on said mechanical device and defining a piston chamber therewith;

a first piston slidably received in said piston chamber; an actuator stem connected at one end to said first piston and at its other end to said control element, said first piston being movable with the actuator stem in the axial direction of the stem to move the control element between first and second operational positions, said first piston being provided with a coaxial bore extending from one face of said first piston to a limited depth in said first piston and defining a piston receiving bore therein;

a smaller second piston slidably mounted in said piston receiving bore;

a piston rod affixed at one end to said second piston and extending through an opening in said actuator housing in sealed relation therewith;

fluid inlet means provided through the wall of said housing and adapted for connection to a source of hydraulic pressure whereby pressurized hydraulic fluid may be selectively admitted to the piston chamber on one side of said pistons for stroking said pistons in one direction therein and moving said control element from one of said operational positions to the other;

compression spring means in said chamber on the side of said pistons opposite said hydraulic fluid receiving sides for continuously urging said first piston in the opposite direction from said one direction;

a stop member affixed to said piston rod and cooperable with said actuator housing to limit the length of the second piston stroke to a lesser length than that of said first piston stroke when hydraulic actuating fluid is admitted to said piston chamber whereby the effective piston area of the actuator for driving the actuator stem and said control element is reduced by an amount equal to the area of the pressure receiving face of said second piston and the stress imposed on the actuator stem and associated components of said mechanical device on termination of said first piston stroke is reduced.

5. An actuator device as set forth in claim 4 wherein said actuator housing is provided with a second inlet means through the wall thereof which is adapted for connection to a source of hydraulic pressure whereby pressurized fluid may be selectively admitted to said piston chamber on the side of said first piston opposite to that which is exposed to hydraulic fluid from said source for assisting the biasing force of said spring means.

* * * * *